Aug. 27, 1946.    G. A. LYON    2,406,390
WHEEL CONSTRUCTION
Filed March 19, 1943    2 Sheets-Sheet 1
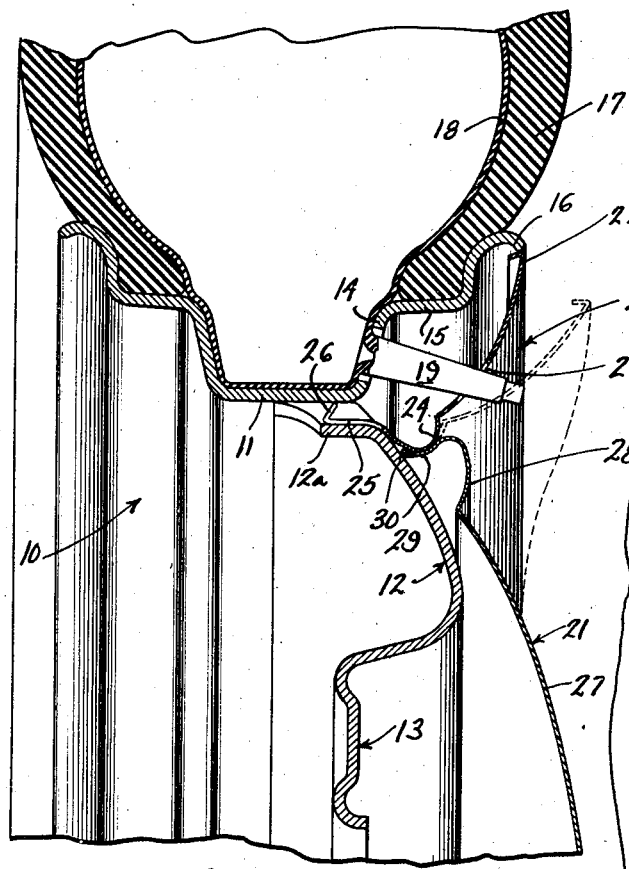
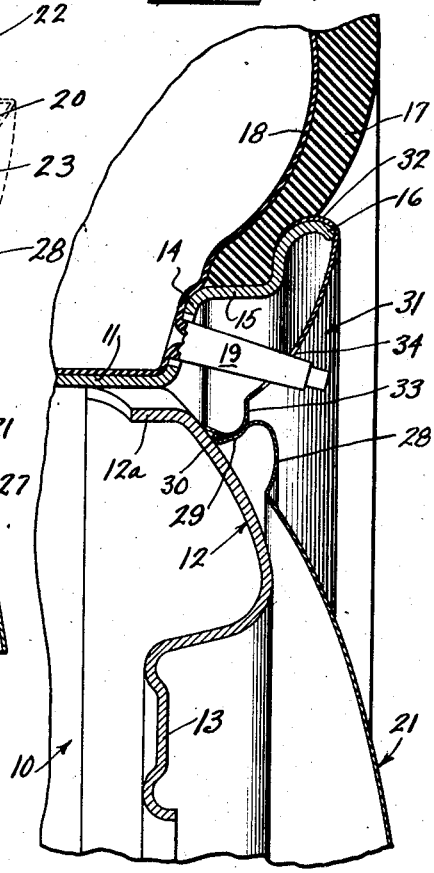
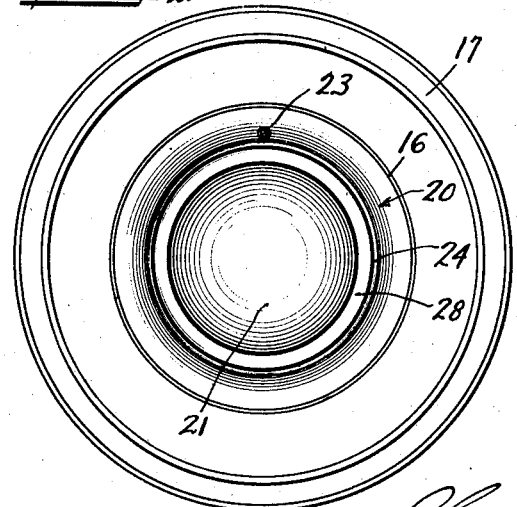
George Albert Lyon.

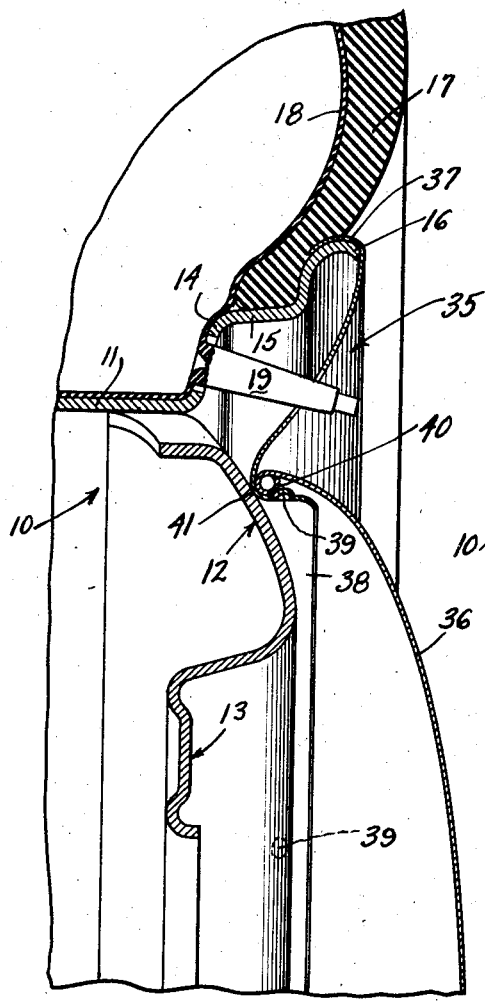

Patented Aug. 27, 1946

2,406,390

UNITED STATES PATENT OFFICE 2,406,390

WHEEL CONSTRUCTION

George Albert Lyon, Allenhurst, N. J.

Application March 19, 1943, Serial No. 479,701

4 Claims. (Cl. 301—37)

This invention relates to an improved wheel structure and is directed more particularly to an improved cover assembly therefor.

An important object of the invention is to provide a novel retaining structure for an ornamental cover assembly adapted for disposition over a wheel structure.

Still another object of the invention is to provide a novel attaching arrangement for a multi-part cover assembly adapted for disposition over a wheel structure.

Still another object of the invention is to provide for a wheel structure a novel cover assembly which is so retained upon the wheel structure that the parts thereof are maintained in tight fitting engagement with each other and with the wheel structure elastically and in such a manner that development of vibratory action or rattling between the parts and the wheel structure due to the parts taking a set, is obviated.

Still another object of the invention is to provide a novel reinforcing arrangement for a cover member adapted for disposition over the outer side of a wheel structure.

While the foregoing aspects of my invention may be utilized with cover members constructed from any one of many sheet materials available, I particularly contemplate the adaptation thereof to cover assemblies in which are used sheet material such as synthetic plastic, rubber, either natural or synthetic, or any other material having elastically flexible, resiliently compressible characteristics. Additionally my invention is well adapted for use with cover assemblies utilizing sheet metal of a thin springy nature.

It is a further object of the invention to provide a multi-part cover assembly of the above character wherein the cover parts may be secured together as a unit so that in the event that an annular radially outer part thereof is constructed from a relatively resilient plastic, the central hub cap simulating portion, should it be constructed from relatively rigid sheet metal, will be protected by the annular part if the cover unit is dropped edgewise on a hard surface.

In accordance with the general features of my invention there is provided herein for a wheel structure, a multi-part cover assembly which includes an outer annular portion and a central hub cap simulating portion, the inner periphery of the outer annular portion being arranged to detachably receive the outer peripheral part of the central hub cap portion and being so configurated that it is reinforced at its inner periphery, this reinforcement being obtained by a cross-sectional beaded configuration which additionally serves as the retaining part for engaging the central hub cap portion, and provides an abutment element for limiting the axial inward movement of the cover assembly to the proper degree during assembly thereof with the wheel structure.

A still further object of the invention is to provide a multi-part cover assembly for a wheel structure which includes an outer annular portion and a central hub cap portion detachably secured thereto, the entire cover assembly being secured to the wheel structure by engagement of a part of the outer annular cover part therewith.

It is another important object of this invention to provide for a cover member, particularly one constructed from a frangible material such as synthetic plastic, rubber, or the like, and having a peripheral beaded snap-on portion, a reinforcement arrangement disposed adjacent the peripheral snap-on bead to reinforce the same against its snap-on movement whereby it engages snap-on means on the wheel structure under increased stress condition thereby to more securely retain the same on the wheel structure. This reinforcement may be provided by a central hub cap member or by other reinforcing means associated with the first named cover member for the specific purpose described above.

Many other objects and advantages of my invention will become apparent from the following description and accompanying drawings in which:

Figure 1 is a fragmentary cross-sectional elevation of a wheel structure embodying one form of my invention;

Figure 2 is a side elevational view of a wheel constructed in accordance with Figure 1;

Figure 3 is a fragmentary cross-sectional view of a wheel structure embodying a modified form of my invention;

Figure 4 is a fragmentary cross-sectional view of a wheel structure embodying still another modified form of my invention;

Figure 5 is a fragmentary cross-sectional view embodying a still further modified form of my invention; and Figure 6 is a fragmentary cross-sectional view showing the action of the construction of Figure 5 during the snap-on or pry-off operation of the cover assembly.

It will be understood that the embodiments shown herein are for illustrative purposes only and may be changed or modified without departing from the spirit and scope of the invention as set forth in the appended claims.

As shown in Figure 1 the reference character 10 designates generally a multi-flange, drop center type of tire rim which is connected as by riveting or welding or the like through a base flange 11 to a central body part or spider 12 which includes a central bolt-on flange 13. A drop center rim 10 is further provided with opposite side flanges 14, opposite intermediate flanges 15 and opposite edge portions 16. A suitable tire 17 having an inner tube 18 and a valve stem 19 is mounted upon the rim, one of the side walls 14 having an orifice through which the valve stem 19 may project. In the type of wheel structure shown in Figure 1 the substantially axially extending flange 12a of the body part 12 is depressed at spaced portions, these depressions affording circumferentially spaced apertures at the junction of the tire rim 10 and the body part 12 of the wheel.

The cover assembly shown in Figure 1 includes an outer annular portion 20 and a central hub cap simulating portion 21. The annular outer cover portion 20 is provided at its outer peripheral edge with a substantially inwardly turned flange 22 and is preferably of such a diameter that it extends substantially over the entire outer side of the wheel rim 10 thus to conceal the same. This cover portion is so cross-sectionally configurated that when disposed over the wheel structure it constitutes in effect a continuation of the side wall of a tire to give the appearance of being a part of the tire and in fact gives the appearance of being a white side wall on the tire 17 in the tire rim 10 when it is colored white.

As will be seen from the drawings, the cover portion 20 is provided with an aperture 23 through which the tire valve stem 19 may project so that it is accessible for inflation of the tire.

From Figure 1 it will be seen that the cover portion 20 of the cover assembly effectively conceals not only the outer side of the tire rim 10 but also will overlie any appurtenances such as wheel balancing weights which might be associated therewith. Under such circumstances it is desirable that the cover portion 20 be, from time to time, locally flexed axially outwardly to render these appurtenances available for servicing and to this end, as indicated previously, the cover member may be constructed from synthetic plastic or other material having the desired resilient flexibility. The flexed position of the cover member as set forth above is shown in dotted lines in Figure 1.

In order that the cover portion 20 be substantially reinforced, particularly at the part thereof which engages the central hub cap portion 21 as will be described presently, it is provided at substantially the inner peripheral part thereof with a radially inwardly facing rib or bead portion 24.

This bead or rib 24 is provided with a peripheral edge having retaining means thereon for engaging the wheel structure to retain the cover assembly thereon, this retaining means including substantially axially inwardly extending arms 25 terminating in axially outwardly, radially outwardly, obliquely disposed fingers 26 which are spaced circumferentially of the cover part 20 to be aligned with the several circumferentially disposed apertures between the base flange 11 of the tire rim 10 and the flange 12a of the body part 12. The terminal edges of the finger members 26 are so arranged as to prescribe a circle having a diameter larger than that of the circle prescribed by the radially inner surface of the base flange 11 of the tire rim 10. Thus as the cover portion 20 is urged axially inwardly of the wheel structure with the fingers 26 in registry with the circumferentially spaced apertures in the wheel structure, the fingers 26 are deflected radially inwardly and slide over the opposed faces of the flanges 11 and 12a. Upon reaching the position shown in Figure 1 it will be seen that any attempted withdrawal of the cover portion 20 will cause the terminal ends of the fingers 26 to bite into the radially inner surface of the base flange 11 of the tire rim and withdrawal will be prevented.

The cover assembly shown in Figure 1 is completed by the attachment of the central hub cap simulating portion 21 thereto. The hub cap portion 21 is provided with a central crown portion 27 having the peripheral margin thereof formed cross-sectionally to provide an ornamental reinforcing bead 28 terminating in a snap-on flange 29 having a peripheral bead 30. The snap-on flange or skirt 29 is cross-sectionally formed to provide an annular depression or groove which faces radially outwardly and is adapted to receive the radially inner surface of the bead 24 of the cover portion 20 in nested relationship after the peripheral bead 30 thereof has been urged axially inwardly over the surface of the bead 24 into the position shown in Figure 1.

From the foregoing it will be seen that the bead 24 has many advantages which contribute to the strength and efficiency of the entire cover assembly. During the assembly of the cover part 20 upon the wheel by axially inward movement of the cover relative thereto, it will be seen that the bead 24 effectively acts as a stop or limiting device whereby the inserting operation must necessarily cease when the flange 22 on the outer periphery thereof is disposed in the desired position as shown in Figure 1. The bead 24 also serves as an efficient reinforcing medium for the cover part 20 and furthermore acts to afford flexing of the retaining member arms 25 during the insertion operation so that the retaining members are easily aligned radially with the circumferentially spaced apertures in the wheel structure and to afford flexing of the cover member about the arms 24 of the retaining members. Additionally the bead 24 serves as a reinforcing agency for the cover member 20 so that the snap-on flange 29 of the hub cap member 21 may be securely retained in snap-on pry-off relationship.

As indicated previously the cover portion 20 is desirably formed from a flexible resilient material such as synthetic plastic or the like and the provision of the bead 24 therein not only provides the necessary snap-on pry-off distortion for the central hub cap part but also, at the same time, provides the necessary reinforcement for the relatively flangible cover member 20 whereby the latter may withstand the pressure engagement of the central hub cap member 21 and further will withstand the pry-off operation necessary to remove the hub cap 21 therefrom to render the bolt-on flange 13 of the wheel structure accessible.

Another important advantage of the attaching engagement between the central hub cap portion 21 and the cover part 20 when the latter is made of plastic is that the hub cap portion of the cover is retained resiliently or elastically in engagement with the assembly, this elastic or resilient retention obviating the development of relative vibration between the parts or rattling therebetween should the central hub cap portion be constructed from metal and take a set after being retained on the wheel structure for a period of time.

In the construction of Figure 3 the central hub cap portion 21 is similar to that disclosed in Figure 1. In this construction, however, the entire cover assembly including the central hub cap part 21 and the radially outer annular part 31 is retained upon the wheel structure by virtue of a substantially axially inwardly extending flange 32 formed at the outer peripheral edge of the cover portion 31, this flange 32 being of such cross-sectional magnitude that it extends substantially axially inwardly over the radially outer surface of the edge portion 16 of the tire rim sufficiently far to be wedged between the edge portion of the tire rim and the adjacent portion of the side wall of the tire 17 when the tire is inflated.

If the cover portion 31 is constructed from a sheet material having sufficient resiliency, it will be seen that the flange 32 may be snapped over the edge portion 16 of the tire rim 10 to assemble the cover member on the wheel structure. If desired however the flange may be split transversely to facilitate this yielding or resilient action of the flange 32 during the snap-on or pry-off operation.

In this construction the inner peripheral margin of the cover member 31 is likewise formed with a radially inwardly extending reinforcing bead 33 as in the construction shown in Figure 1. The bead 33 however terminates in a peripheral edge portion which is arranged for abutting engagement with the outer surface of the body part 12 of the wheel structure. In this construction also the snap-on flange 29 and the peripheral bead 30 of the cover portion 21 is slidingly engaged over the bead 33 to afford snap-on pry-off engagement of the central cover portion 21 with the outer annular portion 31. In this construction also the tire valve 19 extends substantially axially outwardly of the wheel structure sufficiently far to protrude through a registering aperture 34 in the cover part 31 thereby to be accessible for inflation of the tire. From the foregoing it will be seen that the construction of Figure 3 is attached and detached from the wheel structure by virtue of the snap-on pry-off engagement of the flange 32 with the edge portion 16 of the tire rim and thus removal or attachment of the entire cover assembly may be accomplished by engagement or disengagement of the flange 32 with the wheel structure without necessitating the removal of the central hub cap simulating cover part 21 from the outer annular cover part 31.

It will be understood that the attributes described in connection with the construction of Figure 1 are likewise present in the construction of Figure 3.

In the construction of Figure 4 the cover assembly includes an outer annular portion 35 adapted for disposition over the outer side of the tire rim and extending radially peripherally inward to overlie a portion of the spider 12 and a hub cap simulating central portion 36 which is adapted for snap-on pry-off attachment to the cover portion 35 as will be explained presently.

In this construction, as in the construction shown in Figure 3, the entire cover assembly is retained upon the wheel structure by virtue of a flange 37 at the outer peripheral edge of the cover part 35, this flange 37 being arranged to overlie the radially outer surface of the edge portion 16 of the tire rim 10 and having a transverse depth sufficiently great so that it is wedged between the adjacent side wall of a tire in the tire rim and the edge portion thereof when the tire is inflated.

In this construction the cover portion 35 is provided at its inner peripheral edge with a substantially outwardly extending snap-on flange 38 which is provided with spaced, radially outwardly extending bumps 39.

As will be seen from Figure 4 the bumps 39 are adapted to receive, on their axially inward surfaces, a snap-on bead 40 formed at the outer periphery of the central hub cap simulating portion 36 of the cover assembly. As will be seen from the drawings the curved junction 41 between the body portion of the cover member 35 and the snap-on flange 38 thereof is arranged to rest against the adjacent portion of the outer surface of the body part 12 and thus in effect constitutes a liner between the bead 40 of the central hub cap portion 36 and the body part 12. As previously indicated the cover part 35 is preferably constructed from a material giving it resilient characteristics and thus in its sandwiched relationship, as shown in Figure 4, the portion 41 thereof serves as a cushion to prevent the development of vibration and rattling between the central hub cap portion 36 and the wheel structure.

In the construction shown in Figure 5 the body part 12 of the wheel structure is so cross-sectionally configurated as to provide radially inwardly extending bumps 12b which are adapted to receive the cover assembly in snap-on pry-off relationship in a manner to be presently described. In this construction the cover assembly includes an outer annular portion 42 having a turned peripheral edge 42a disposed radially outwardly of the edge portion 16 of the tire rim 10 and a central hub cap simulating portion 43, the latter being provided with an intermediate radially outwardly extending rib portion 44, a substantially axially inwardly extending snap-on flange 45 terminating in a peripheral snap-on bead 46.

The cover member 42, formed preferably from a synthetic plastic or a rubber-like material having the desired resiliency and flexibility is provided with a cross-sectional configuration of such shape and magnitude that it extends over and conceals the outer side of the tire rim 10 and extends radially inwardly over a substantial portion of the spider 12 thus effectively concealing a large part of the outer side of the wheel structure and constituting in appearance a continuation of the side wall of the tire to give the tire a massive appearance.

In this construction the outer annular cover portion 42 is likewise provided with a bead 47, this bead 47 however being arranged to extend substantially axially outwardly and terminating in a substantially axially inwardly extending snap-on flange 48 terminating in a snap-on bead 49. The circular dimensions of the snap-on bead 46 of the central cover member 43 and the snap-on flange 48 of the outer cover member 42 are such that the central hub cap portion 43 may be urged axially inwardly of the cover portion 42 so that bead 46 thereof overrides the outer part of the bead 47 on the cover portion 42 and comes to rest in a radially inwardly facing shallow groove provided by the cross-sectional configuration of the snap-on flange 48 of the cover portion 42. Thus it will be seen that the cover portions of this construction may be effectively retained as a unitary structure and as will be seen presently this unitary structure may be removed bodily or attached bodily to the wheel structure without the parts being separated.

It is to be particularly noted that when the cover parts are in their assembled relationship as shown in Figure 5 the resilient snap-on flange 48 of the cover part 42 over-extends the snap-on flange 45 of the cover portion 43 in an axially inward direction and that the bead 49 of the outer cover member 42 alone provides the snap-on engagement with the bumps 12b of the body part 12 of the wheel structure. By reference to Figure 6 the advantage of this construction will be clearly understood. As previously indicated the outer cover member 42 is preferably constructed from a resilient yieldable material and accordingly when the cover parts 42 and 43 have been assembled as a unit they may be attached to the wheel structure merely by pressing the entire assembly axially inwardly whereby the bead 49 of the cover member 42 overrides the bumps 12b of the body part 12 and comes to rest on the substantially axially inwardly disposed face thereof. As will be seen from Figure 6 the action of the bead 49 and the adjacent portion of the snap-on flange 48 during attachment and detachment of the cover assembly comprises a radially inwardly compression of the over-extending portion of the yieldable flange 48 and the bead 49, the snap-on flange 45 of the cover member 43 and its peripheral bead 46 serving as a reinforcing, fulcrum point for the inward flexing of the inner peripheral edge of the cover member 42. With such a construction it will be seen that the cover assembly is retained upon the wheel structure by engagement of the yieldable cover member 42 and that the cover member is retained in position by engagement with the yieldable snap-on flange 48 of the cover member 42. Accordingly it will be seen that parts of the cover member 42 are interposed between the hub cap simulating portion 43 and the wheel structure thus to insure against the development of vibration and rattling between the parts. Furthermore this flexing action of the inner peripheral portion of the cover member 42, because it is securely backed up or reinforced by the bead 46 of the cover member 43, serves efficiently to retain the entire cover assembly upon the wheel structure in snap-on relationship.

What I claim is:

1. In a cover structure for a wheel including a multi-flanged tire receiving rim member and a body member, a wheel cover for substantially covering exposed side flanges of the rim member made of form sustaining but resiliently yieldable plastic material and formed for detachable engagement with a wheel member, said cover comprising an annulus having an inner margin formed into a radially extending yieldable hollow rib and a hub cap seated on and nestingly engaged with said yieldable rib so as to be resiliently retained thereby on the wheel.

2. In a cover structure for a wheel including a multi-flanged tire receiving rim member and a body member, a wheel cover for substantially covering exposed side flanges of the rim member made of form sustaining but resiliently yieldable plastic material and formed for detachable engagement with a wheel member, said cover comprising an annulus having an inner margin formed into a radially extending hollow rib and a hub cap snapped into resilient engagement with said rib and retained thereby on the wheel, said annulus having its outer margin turned rearwardly into a hollow rib of a diameter to elastically fit over and around an outer edge of the rim member adjacent the tire to retain the cover on the wheel.

3. In a cover structure for a wheel including a multi-flanged tire receiving rim member and a body member, a wheel cover for substantially covering exposed side flanges of the rim member made of form sustaining but resiliently yieldable plastic material and formed for detachable engagement with a wheel member, said cover comprising an annulus having an inner margin formed into a radially extending hollow rib and a hub cap snapped into resilient engagement with said rib and retained thereby on the wheel, said hub cap having a beaded outer edge snapped into nested cooperation with said rib of said cover and yieldably seated thereon.

4. In a cover structure for a wheel including a multi-flanged tire receiving rim member and a body member, a wheel cover for substantially covering exposed side flanges of the rim member made of form sustaining but resiliently yieldable plastic material and formed for detachable engagement with a wheel member, said cover comprising an annulus having an inner margin formed into a radially extending hollow rib and a hub cap snapped into resilient engagement with said rib and retained thereby on the wheel, said rib of the cover being provided with rearwardly extending retaining means for detachable engagement with one of said wheel members.

GEORGE ALBERT LYON.